United States Patent [19]

McCrea

[11] Patent Number: 5,214,369
[45] Date of Patent: May 25, 1993

[54] UNIVERSAL BATTERY CHARGER

[75] Inventor: Scott W. McCrea, Guthrie, Okla.

[73] Assignee: The Charles Machine Works, Inc., Perry, Okla.

[21] Appl. No.: 814,899

[22] Filed: Dec. 30, 1991

[51] Int. Cl.[5] ............................................. H02J 7/10
[52] U.S. Cl. ........................................ 320/21; 320/39; 320/59; 320/DIG. 2
[58] Field of Search ............... 320/31, 21, 59, DIG. 2, 320/39

[56] References Cited

U.S. PATENT DOCUMENTS

| | | | |
|---|---|---|---|
| 3,305,755 | 2/1967 | Walsh | 320/40 |
| 3,310,724 | 3/1967 | Grafham | 320/39 |
| 3,376,488 | 4/1968 | Walsh | 320/40 |
| 3,471,771 | 10/1969 | Mortimer | 323/22 |
| 3,599,073 | 8/1971 | Wilson | 320/39 |
| 3,601,688 | 8/1971 | Dogadko et al. | 323/20 |
| 3,767,994 | 10/1973 | Dittmar et al. | 320/20 |
| 3,816,807 | 6/1974 | Taylor | 320/20 |
| 3,867,681 | 2/1975 | Bishop et al. | 320/21 |
| 3,943,423 | 3/1976 | Hoffman | 320/22 |
| 3,947,754 | 3/1976 | Wechsler | 323/22 SC |
| 3,970,913 | 7/1976 | Heindl | 320/48 |
| 4,281,639 | 10/1966 | Potter et al. | 320/43 |
| 4,321,523 | 3/1982 | Hammel | 320/14 |
| 4,386,333 | 5/1983 | Dillan | 336/107 |
| 4,746,852 | 5/1988 | Martin | 320/20 |
| 4,774,449 | 9/1988 | Elkins | 320/21 |
| 4,815,983 | 3/1989 | Erickson et al. | 439/173 |
| 4,849,682 | 7/1989 | Bauer et al. | 320/21 X |
| 4,900,270 | 2/1990 | Edwards et al. | 439/502 |
| 4,983,904 | 1/1991 | Iwahashi | 320/31 X |
| 4,998,056 | 3/1991 | Cole | 320/35 |

FOREIGN PATENT DOCUMENTS 2430339 1/1975 Fed. Rep. of Germany.
2110013 6/1983 United Kingdom.

Primary Examiner—R. J. Hickey
Attorney, Agent, or Firm—Richards, Medlock & Andrews

[57] ABSTRACT

A battery charger having an input receptacle, and different AC electrical cords pluggable therein for adapting the charger to a variety of different AC distribution systems. Portions of rectified signals are coupled by a triggerable switching device to a battery to be charged. The switching device is triggered only on a negative slope portion of the rectified signal, at a specified rectified signal amplitude, only when a battery is connected to the charger, and when the battery indeed requires charging.

23 Claims, 3 Drawing Sheets

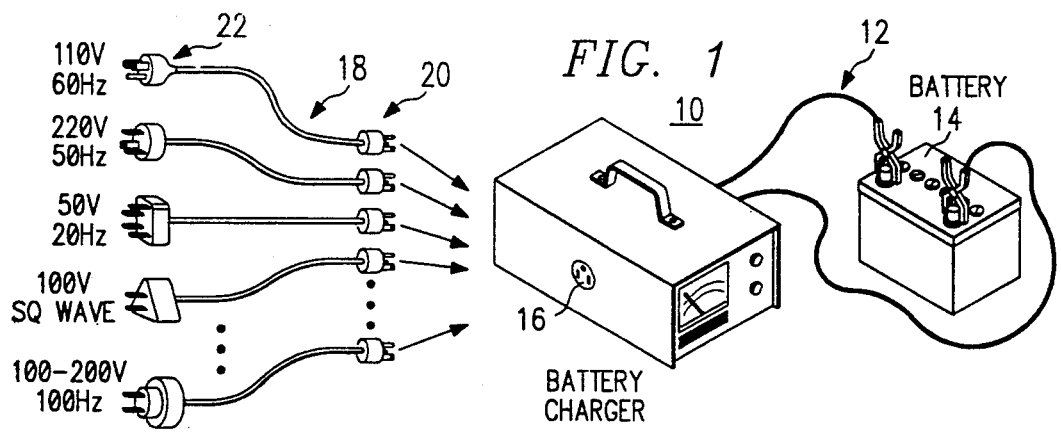
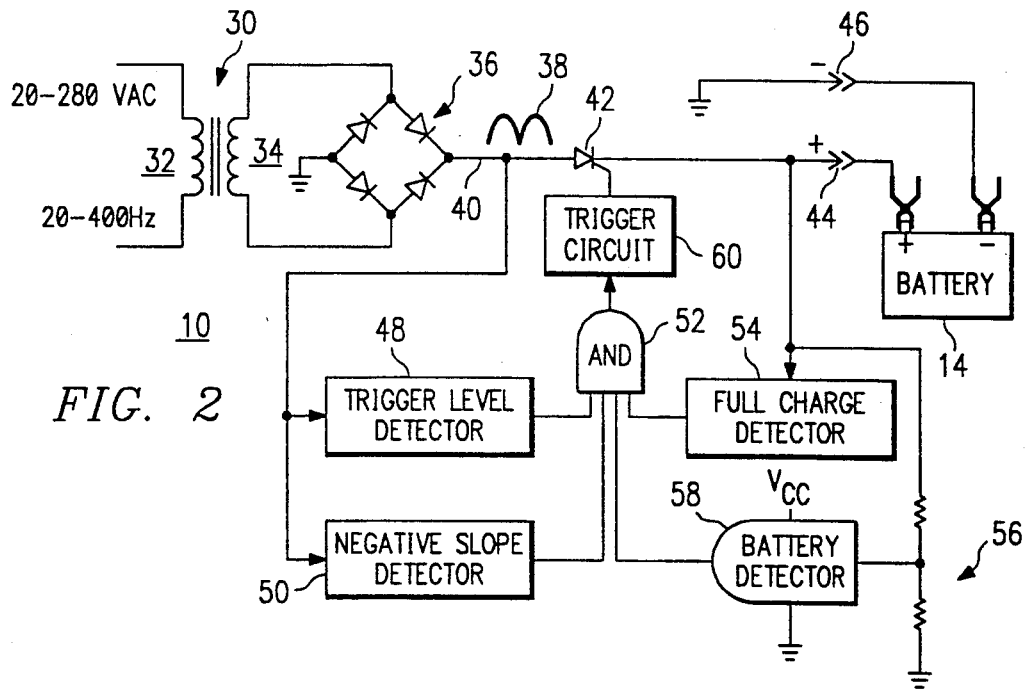
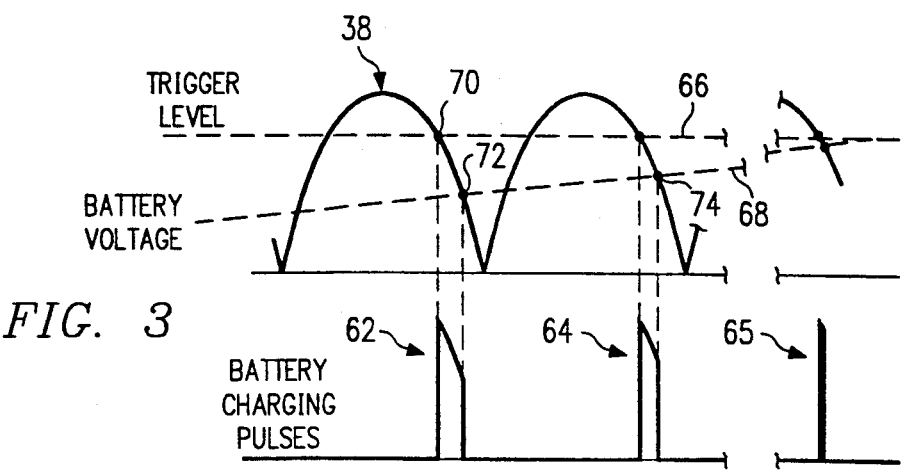

UNIVERSAL BATTERY CHARGER

TECHNICAL FIELD OF THE INVENTION

The present invention relates in general to battery charging circuits and techniques, and more particularly to battery chargers of the type adapted for connection to different AC power sources, and for providing control over the amount of charging energy supplied to a battery connected thereto.

BACKGROUND OF THE INVENTION

In general, battery chargers provide the rudimentary function of converting a readily available AC voltage into either a varying or stead state DC voltage for charging a rechargeable battery. Beyond this general definition, battery charging techniques diverge in a host of different directions to provide recharging facilities for batteries. For example, many conventionally available battery chargers are pluggable into a 60 Hz, 110 VAC outlet for providing either a half-wave or full-wave rectified signal for charging, for example, a 12-volt automobile battery. Such chargers are generally not universal, in that they can only be plugged into the 110 VAC source and are capable only of charging a 12 volt battery. Similarly, other commercially available chargers, such as for 1.5 volt rechargeable batteries, are usable only in conjunction with the 1.5 volt batteries. While such type of chargers may or may not be electrically capable for use with other types of AC sources, such as the European 50 Hz, 220 VAC outlets, the AC cords permanently attached to such battery chargers cannot be used with the receptacles of the European AC or other systems. Because of the diverse types of AC distribution systems throughout the world, the foregoing conditions have required that manufacturers develop battery charging systems that satisfy the technical requirements of the different types of batteries, as well as the availability for use in countries having line power ranging from 60 Hz, 110 VAC to 50 Hz, 260 VAC. Often, in order to accommodate the different AC power systems in the world, manufacturers provide different models of battery chargers for use with the different AC distribution systems. This not only increases the manufacturing costs, but also requires additional inventory space for the full line of battery chargers.

A common practice in the design of battery chargers is to utilize a transformer and a rectifier to produce a unipolar voltage, and a series resistance to limit the charging current provided to the battery. Not only is the series resistance wasteful of power dissipated as heat, but also such type of chargers are often unable to eliminate overcharging of a battery, which result can be detrimental to sealed lead-acid type of batteries. In other words, if a battery charger continues to provide current into an otherwise fully-charged lead-acid battery, uneven charging of the battery plates can develop, thereby adversely affecting the life thereof. Other complex battery charging systems provide a very stable DC supply voltage with current sensing and control elements as well as circuits to limit battery charging time or rate. Such type of battery chargers can be very expensive to manufacture.

From the foregoing, it can be seen that a need exists for a universal battery charger that can be readily adapted for use with a variety of different AC distribution systems, and in which the AC conversion circuits are simplified and very cost effective. Another need exists for an economical battery charger which provides a charging current only when needed, and which provides charging energy having parameters that are independent of the input AC voltage to which the charger is connected. A further need exists for a battery charger which will not produce an output voltage unless a battery is connected thereto, and then only to the extent necessary to fully charge the battery and maintain it charged without overcharging.

SUMMARY OF THE INVENTION

In accordance with the present invention, battery charger circuits, and methods of operation thereof, are disclosed which reduce or eliminate the disadvantages and shortcomings associated with prior circuits and techniques. According to an important aspect of the invention, the battery charger includes a semiconductor device that is triggered for coupling pulses to a battery to be charged without the use of a series resistance. The device is triggered only if certain criteria are satisfied, such as whether a battery is indeed connected to the charger, whether the battery requires charging and if an input rectified waveform has reached a specified instantaneous value.

According to the preferred embodiment of the invention, a switching device comprising a silicon controlled rectifier (SCR) is triggerable for coupling a portion of a full-wave rectified input signal to a battery connected to the output of the charger, but only if the battery terminal voltage is below a specified level. Further, the SCR is triggered at a predetermined amplitude on the negative slope portion of each full-wave rectified signal. An electrical indication of each of the criterion that must be satisfied is logically ANDed and the result thereof provided as a trigger to the SCR.

A technical advantage of sensing circuits for detecting the connection of a battery eliminates the possibility of damage to the charger due to short circuiting of its output terminals, as well as a possibility of hazardous shock to operating personnel. Another technical advantage of battery voltage sensing circuits is that if the battery indeed does not require charging, the battery charger will not provide electrical energy to the battery, thereby alleviating the possibility of overcharging. Yet another technical advantage of the triggering of the switching device at a predetermined level on the rectified signal is that, notwithstanding the peak voltage of the rectified AC signal, an energy pulse of substantially constant amplitude is provided to the battery to be charged, thereby eliminating the possibility of charging the battery too quickly and overheating the plates. A technical advantage of triggering the switching device on the negative slope of the rectified waveform, and at the specified magnitude, is that the amplitude of the charging pulse coupled to the battery never increases in value from the predetermined level, but is always characterized as a decreasing amplitude signal, again alleviating the possibility of overcharging or charging the battery too quickly.

In accordance with another feature of the invention, an input logic threshold to a commercially available logic gate is set by a resistor divider, to a level corresponding to the battery terminal voltage that is representative of a substantially dead battery. The presence of a battery connected to the charger can thereby be detected by the logic output of the gate.

According to another feature of the invention, a transformer is employed that is operational over a broad frequency range, as well as a broad range of input AC amplitudes so that battery charging capabilities can be provided with a wide variation of input AC characteristics. An associated advantage is that the battery charger of the invention is equipped with a single input AC receptacle to which numerous AC cords can be connected. Each AC cord is provided with the same plug at one end for plugging into the battery charger receptacle, and with a different type of plug at the other ends that is especially adapted for a socket configuration as generally utilized in the different countries of the world. With this arrangement, by selecting the appropriate input AC cord, the battery charger can be connected to a wide range of AC voltage sources to provide battery charging capabilities.

BRIEF DESCRIPTION OF THE DRAWINGS

Further features and advantages will become more apparent from the following and more particular description of the preferred embodiment of the invention, as illustrated in the accompanying drawings, in which like reference characters generally refer to the same elements or parts throughout the views, and in which:

FIG. 1 illustrates the battery charger of the invention adapted for use with numerous AC input cords;

FIG. 2 is a schematic block diagram of the battery charging circuits of the invention;

FIG. 3 depicts various electrical waveforms that illustrate the operation of the battery charger of FIG. 2;

DETAILED DESCRIPTION OF THE INVENTION

Figure 4:
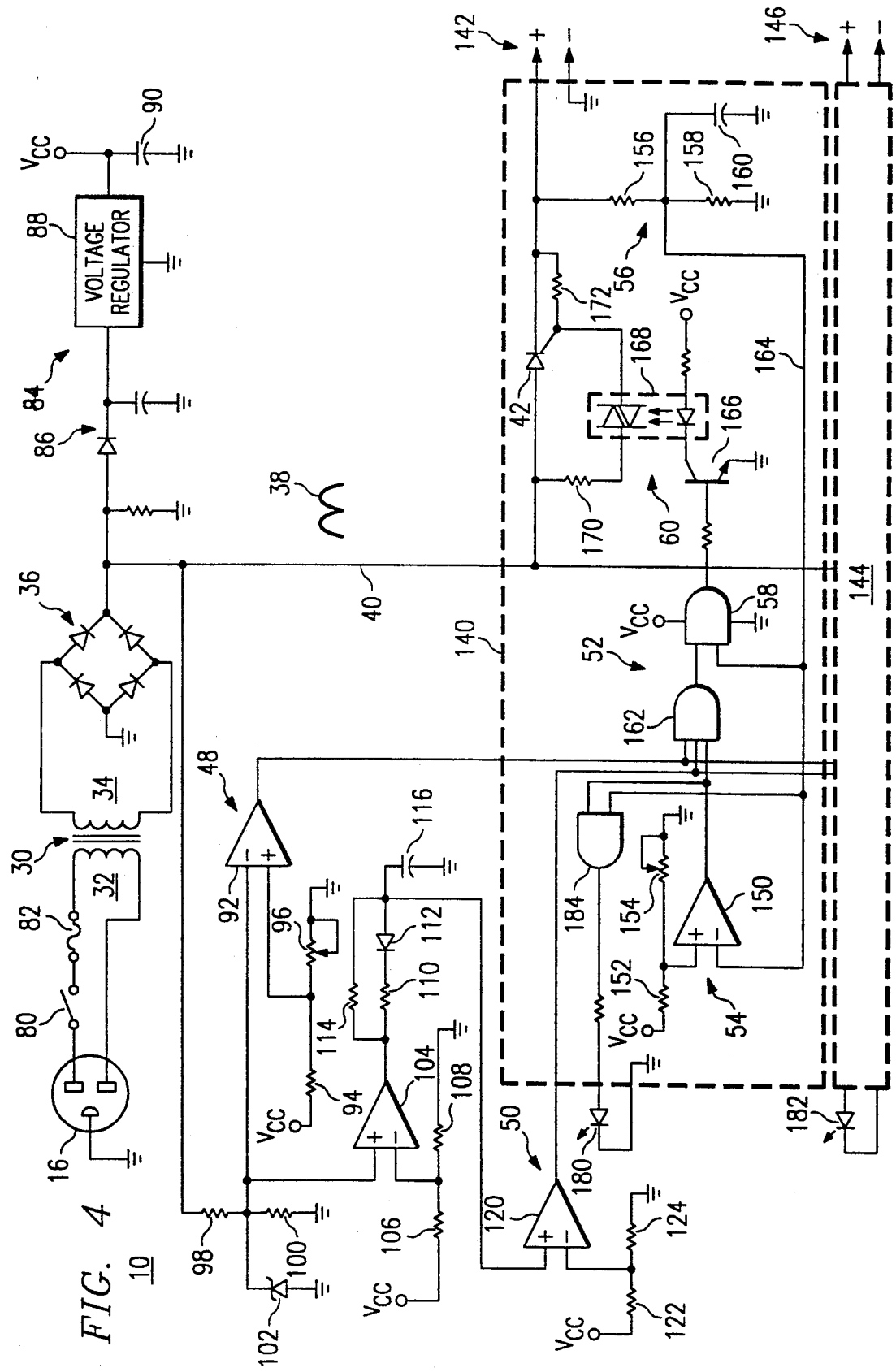
FIG. 4 is a detailed schematic diagram of the various circuits of the battery charger of the invention.

FIG. 1 illustrates the battery charger 10 of the invention, with heavy duty electrical cables 12 connected to a battery 14 to be charged. The battery charger 10 is adapted for providing a charging current to any type of rechargeable battery, including automobile, boat, airplane, auxiliary electrical systems, flashlights, whether of the sealed or unsealed type, lead-acid, or otherwise. The electrical cables 12 include end connections or brackets for attaching to the battery to be charged.

In accordance with an important feature of the invention, the battery charger 10 includes a single AC input receptacle 16 for receiving input AC power signals. The receptacle 16 may be of the male or female type, preferably having three contacts, one each for power, neutral and ground connections. The battery charger 10 is also provided with numerous AC electrical cords 18, each having the same type of connector 20 attached to one end, which connector 20 is mateable with the receptacle 16 of the battery charger. In this manner, the end of any one of the AC cords 18 having the electrical connector 20 can be readily plugged into the battery charger AC receptacle 16. The other end of each of the AC cords 18 includes a different type of AC plug or receptacle 22 that is mateable with the respective AC outlet configuration of the various distribution systems with which the battery charger 10 can be used. The AC plugs 22 can be of the type having either plug or socket contacts. Many countries of the world have different types of AC outlet configurations, many of which require specialized AC plugs 22. Accordingly, by providing a separate AC cord 18 having the particular AC plug 22, the battery charger 10 can be utilized with substantially any AC distribution system in the world.

FIG. 2 illustrates in schematic block diagram form the various electrical circuits of the battery charger 10 of the invention. It should be noted that while the battery charger 10 includes numerous circuits for advantageously providing various functions, those skilled in the art may find that not all such circuits can or should be utilized for specific applications. The battery charger 10 includes an input transformer 30 having a primary 32 connected to the AC receptacle 16 (FIG. 1) for coupling AC supply voltages to the battery charger. The transformer 30 is preferably of the type that can function with an input AC voltage between about 20–280 VAC, with frequencies ranging from about 20–400 hertz. In the preferred form of the invention, the transformer 30 is of a type P-8707 obtainable from Stancor. The transformer primary 32 and secondary 34 comprise a step-down transformer characterized by a primary-secondary ratio of about 5.5. The output AC signals of the transformer secondary 34 are rectified by a full wave bridge 36 comprising four diodes connected in a conventional manner. While bridge rectification is illustrated, other rectification techniques can be employed, including half-wave rectification. The full-wave rectified signal 38 is provided on the full-wave bridge output 40, and therefrom to the anode of a silicon controlled rectifier (SCR) 42. The cathode of the SCR 42 is connected to the positive terminal 44 of the battery charger 10. The negative terminal 46 of the battery charger is connected to circuit common, or ground.

The full-wave rectified signal 38 from the diode bridge 36 is connected to a trigger level detector 48 and also to a negative slop detector 50. The trigger level detector 48 senses when the full-wave rectified signal 38 is at or below a predetermined voltage. The negative slope detector 50 senses when the full-wave rectified signal 38 is operating on the negative slope portion of the varying amplitude signal. The trigger level detector 48 and the negative slope detector 50 provide respective outputs to a circuit 52 that functions to logically AND input logic states.

The positive output terminal 44 of the battery charger 10 is connected to the positive terminal of the battery 14, while the negative output terminal 46 is connected to the negative terminal of the battery 14. The positive terminal of the battery 14 is connected to a full charge detector 54, via the output battery charger terminal 44. The full charge detector 54 includes circuits for detecting whether a battery 14 connected thereto is in need of charging. The positive terminal of the battery 14 is also connected by way of the battery charger terminal 44 to a resistor divider 56 to provide a corresponding voltage to the input of a logic gate 58. In the preferred form of the invention, the logic gate 58 comprises an AND gate connected between a supply voltage VCC and ground. The resistor divider 56 provides an input logic high voltage to the gate 58 when the terminal voltage of battery 14 is between full charge and substantially dead, thereby indicating the presence of a battery connected to the charger 10.

The full charge detector 54 and the battery detector 58 have respective outputs connected to the input of the logic AND circuit 52. The logic AND circuit 52 has an output connected to a trigger circuit 60 which functions to trigger the switching device 42 only when the inputs of the logic AND circuit 52 have been satisfied. With this arrangement, the trigger circuit 60 is enabled by the logic AND circuit 52 only when the following criteria is satisfied: when the trigger level detector 48 detects a predefined voltage level of the full-wave rectified waveform 38, when the negative slope detector 50 senses that the waveform 38 is operating on a negative slope thereof, when a battery is indeed connected to terminals 44 and 46 of the charger, as determined by the battery detector 58, and lastly, when the full charge detector 58 determines that the battery 14 requires charging. Only when all these criteria are satisfied, is the trigger circuit 60 enabled, whereupon the switching device 42 is triggered. Once triggered, the switching device 42 passes a single pulse of electrical energy to the battery 14. Those skilled in the art may find it advantageous to combine the detectors 48 and 50 together, as well as combine the detectors 54 and 58 to function together.

FIG. 3 illustrates two electrical waveforms for facilitating the understanding of the operation of the battery charger 10 of the invention. The first waveform of FIG. 3 depicts the full-wave rectified waveform 38. The second waveform illustrates a pair of battery charging pulses 62 and 64 that have been generated as a result of the circuits shown in FIG. 2. A third pulse 65 is shown later in the time frame. An exemplary predefined trigger level 66 is illustrated, as well as the rising battery terminal voltage, which is shown as broken line 68.

Assuming for purposes of illustration that a battery 14 is indeed connected to the battery charger 10, and that the battery 14 does indeed require charging, the circuit operation is carried out as follows. The full charge detector 54 and the battery detector 58 provide respective enabling inputs to the AND circuit 52. The instantaneous voltage 70 on the rectified signal 38 illustrates a point that meets both criteria sensed by detectors 48 and 50. In other words, point 70 corresponds to the trigger level 66, as well as coincides with the negative slope of the rectified waveform. Accordingly, the trigger level detector 48 and the negative slope detector 50 provide enabling inputs to the AND circuit 52, thereby gating the trigger circuit 60. As a result, the trigger circuit 60 provides a trigger signal to the switching device 42 to place it into conduction. The switching device 42 thereby essentially provides a short circuit between the full-wave rectifier output 40 and the positive terminal of the battery 14. A charging pulse 62 is shown generated for transferring energy to the battery 14. The maximum amplitude of the charging pulse 62 is that of the trigger level 66, which amplitude is independent of the peak voltage of the AC signal coupled to the battery charger 10. For instance, if the trigger level 66 is 20 volts, then the charging pulses 62 and 64 will also have a 20-volt peak level, even if the full-wave rectified peak amplitude is 50 volts, 100 volts, 200 volts, etc. This feature provides control over the extent and rate of battery charging so that for higher amplitude full-wave signals, the battery does not become charged at a faster rate and thereby heat the battery plates excessively. While the amplitude of the charging pulses 62 and 64 follow the shape of the corresponding rectified waveform, each such charging pulse is characterized by a substantially constant peak voltage.

As is well known in the art, the characteristics of an SCR, a triac or other similar device, when such device is triggered into conduction, remains in conduction until the anode-cathode current falls below a quenching or cut-off level. As noted in waveform 38 of FIG. 3, when the full-wave voltage falls to point 72, the anode-cathode voltage of the switching device 42 is such that conduction cannot be maintained, whereupon the switching device 42 turns off. It should be noted that because the cathode of the switching device 42 is connected directly to the positive terminal of the battery 14, the DC battery voltage always appears at the cathode of the switching device 42. However, the full-wave rectified signal appears at the anode terminal of the switching device 42, and thus when the instantaneous voltage of the full-wave signal 38 falls below that of the battery terminal voltage, the switching device 42 is no longer forward biased, and thereby ceases conduction. As a result, the falling transition of the charging pulse 62 terminates when the full-wave signal 38 falls to a level as indicated by numeral 72.

As a result of the energy supplied to the battery 14 because of the charging pulse 62, the battery 14 becomes charged and its terminal voltage increases, as noted by the slope of broken line 68. Because the battery terminal voltage increases, the voltage applied to the cathode of the switching device 42 also increases, whereby the switching device cut-off point 74 moves upwardly on the succeeding full-wave cycles. As a result, the subsequent battery charging pulse 64 is narrower in width. As the battery charger 10 continues to charge battery 14 the charging pulses become narrower until the battery is fully charged, whereupon the switching device 42 remains cut-off and prevents overcharging of the battery 14. However, if the battery 14 remains connected to the charger 10 and if the battery 14 discharges somewhat, the switching device 42 will then again become forward biased, whereupon one or more charging pulses will be generated for maintaining the battery 14 in a fully charged condition. It should also be realized that the full charge detector 54 may sense a fully charged battery and inhibit the generation of triggering the switching device, before the device 42 becomes reverse biased in the manner described above.

With reference now to FIG. 4, the various circuits of the battery charger 10 are shown in more detail. The input AC receptacle 16 is connected to the transformer primary 32 through a panel-mounted off/on switch 80 and a fuse 82. In addition to providing a full-wave rectified signal to the switching device 42, such signal is also coupled to DC voltage conversion circuits 84 for providing a VCC supply voltage to the various circuits of the battery charger 10. An input filter 86 provides a filtered voltage to a conventional integrated circuit voltage regulator 88. The regulator 88 provides an output DC voltage that is further filtered by a capacitor 90. In the preferred form of the invention, the voltage regulator 88 provides a 10-volt DC output voltage for the various comparators and logic circuits described below.

As noted above, the full-wave rectified signal is also coupled from the diode bridge 36 to the trigger level detector 48. The trigger level detector 48 includes a comparator 92 having a noninverting input connected to the junction of a resistor divider defined by fixed resistor 94 and a variable resistor 96. The voltage at the junction of the resistor divider can be varied with resistance 96 to achieve a desired trigger level 66 on the full-wave rectified signal 38 to accommodate batteries of different terminal voltages. The inverting input of comparator 92 is connected to a resistor divider defined by resistors 98 and 100 for reducing the amplitude of the rectified signal applied to the comparator 92. A zener diode 102 is also connected between the divider junction and ground to limit the amplitude of the signal at the junction, and thus protect the inputs of the circuits connected thereto. Preferably, the reverse breakdown voltage of the zener diode 102 is about VCC volts, and thus the voltage at the junction of resistors 98 and 100 does not exceed such voltage. The variable resistance 96 is panel mounted, and thus adjustable for batteries of different terminal voltages.

The amplitude-limited voltage appearing at the junction of resistors 98 and 100 is also provided as an input to the negative slope detector 50. Such detector includes a first comparator 104 having an inverting input connected to the junction of a resistor divider defined by resistors 106 and i 08. The full-wave rectified signal 38, as divided at the resistor divider junction, is connected to the noninverting input of the comparator 104. A charge-discharge network connected to the output of the comparator 104 is effective to generate capacitor charge and discharge waveforms representative of different portions of the full-wave rectified signal 38. The network comprises a series-connected resistor 110 and a diode 112, connected in parallel with another resistor 114. A capacitor 116 is connected between ground and the network. To achieve different time constants, resistor 114 is about 27K ohm, resistor 110 is about 100 ohm, and capacitor 116 is about 0.1 microfarad. Also comprising part of the negative slope detector 50 is a second comparator 120 having an inverting input biased to a reference voltage provided by a resistor divider comprising resistors 122 and 124. The comparator 104 operates in conjunction with the charge-discharge network to sense a slow charging signal followed by a fast discharging signal that is time related to the rectified signal 38. In this manner, the output of the comparator 120 provides a logic low signal during positive slope half cycles of the full-wave signal 38, and logic high levels during the negative slope half cycles of the full-wave signal 38.

Figure 5:
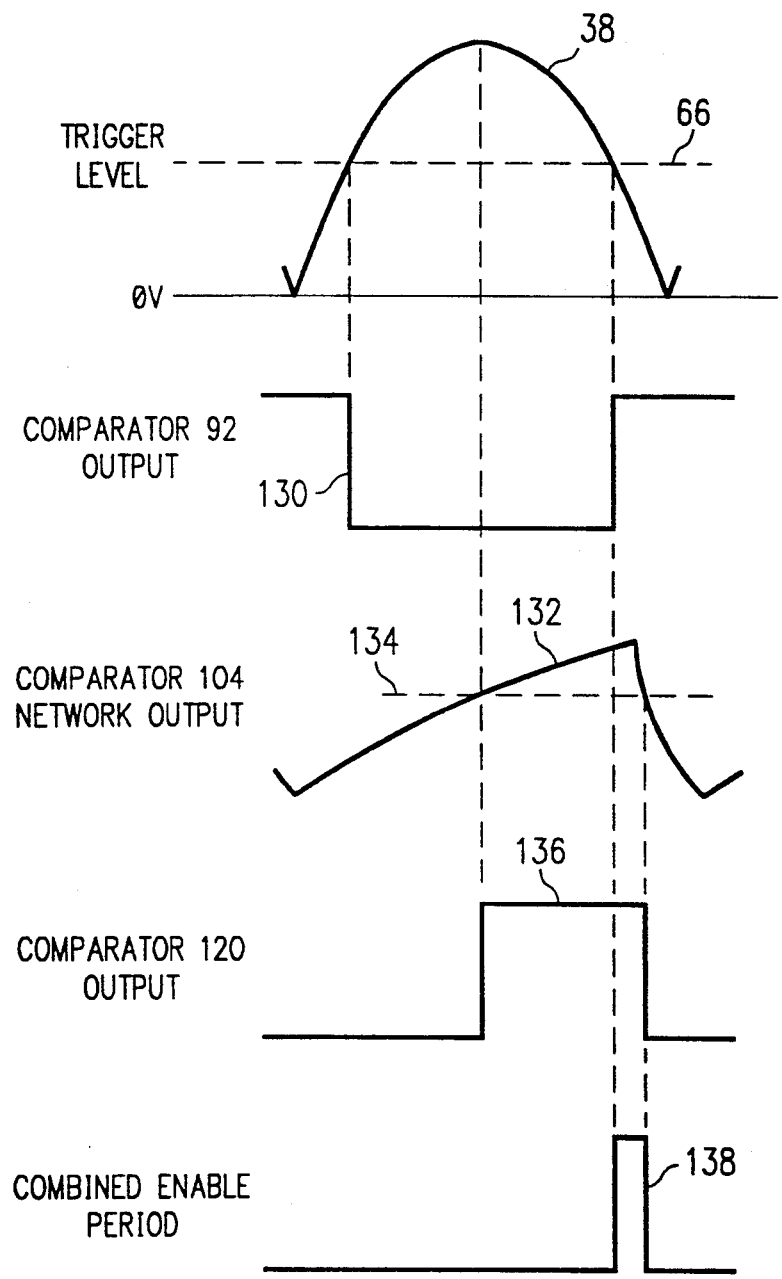
FIG. 5 is a series of electrical waveforms that depict the operation of the trigger level detector and the negative slope detector.

The operation of the trigger level detector 48 and the negative slope detector 50 are shown in FIG. 5. The trigger level amplitude 66 is set by variable resistor 96, thereby providing a reference voltage input to the comparator 92 of the trigger level detector 48. The output signal of the trigger level detector 48, and particularly the comparator 92, is shown as waveform 130, and illustrates that for all periods of the full-wave signal 38 that have instantaneous amplitudes greater than the trigger level, the comparator 92 output is at a logic low. At other instantaneous full-wave signal voltages below the trigger level 66, the comparator 92 output is at a logic high level. As will be described more thoroughly below, the output of the trigger level detector 48 is coupled to the logic AND circuit 52 and thus is enabled only during the logic high periods of the output of the comparator 92. With a VCC supply voltage of about 10 volts, the reference voltage set at the inverting input of comparator 104 is about one volt, as established by the values of resistor 106 and 108. Accordingly, whenever the instantaneous voltage of the full-wave rectified signal 38 rises above about a one volt level, the output of the comparator 104 is at a logic high voltage, otherwise it is a logic low level. Because the full-wave rectified signal 38 is substantially greater than one volt, the output of the comparator 104 is at a logic high level for a majority of the period of the full-wave rectified signal 38. Accordingly, the charge-discharge network slowly charges the capacitor 16 for a majority of the time period, but discharges quickly for a shorter time period. The charge-discharge network output is shown as waveform 132. Capacitor charge and discharge waveform 132 is applied to the noninverting input of comparator 120. The inverting input of the comparator 120 is established at a reference voltage 134 that corresponds to a level on the charge-discharge waveform 132 which coincides in time with the peak of the half-wave rectified signal 38. In other words, the intersection of a reference voltage of about 6.3 volts with the waveform 132 corresponds in time to the peak of the full-wave rectified signal 38. The 6.3 volt level is shown as broken line 134 in FIG. 5. Because the inverting input of the comparator 120 is set at this reference voltage level 134, the output thereof switches to a logic high level for those portions of the charge-discharge waveform 132 that exceed the 6.3 reference voltage level. The time period at which the output of the comparator 92 and comparator 120 are both at a logic high level is illustrated in waveform 138, which defines a window for enabling the logic AND circuit 52. Importantly, the time period 138 uniquely identifies that portion of the rectified signal 38 which is below the trigger level 66 o the negative slope.

The battery charger 10 of the invention includes various duplicated sensing trigger and switching circuits, each adapted for providing battery charging capabilities to different batteries. One such circuit is enclosed by the broken line 140, and is associated with output terminals 142 to which a battery can be connected. In like manner, a duplicated circuit 144 is associated with corresponding output terminals 146 to which another battery can be connected. While two duplicated circuits 140 and 144 are illustrated, others can be employed so that a plurality of batteries can be simultaneously charged, while yet sharing other common circuits of the charger 10. Importantly, the duplicated circuits 140 and 144 are each driven by the same full-wave rectified signal 38 via power bus 40. In addition, a single trigger level detector 48 and negative slope detector 50 are utilized for the duplicated circuits 140 and 144.

With reference to circuit 140, the full charge detector 54 and the battery detector 58 will be described in more detail. The full charge detector 54 includes a comparator 150 having a noninverting input connected to a reference voltage defined by a resistor divider with fixed resistor 152 and variable resistor 154. The variable resistor 154 is preadjusted so that a reference voltage is established at the noninverting terminal of the comparator 150, which reference voltage is related to a battery terminal voltage that is of less than full charge rating. The reference voltage is related to a minimum battery terminal voltage so that a battery having at least such a terminal voltage, when connected to the terminals 142, and divided down by the resistor divider 56 is substantially equal to the reference voltage on the inverting input of the comparator 150. The battery terminal voltage is also divided by resistors 156 and 158 in an amount to satisfy the minimum logic threshold conditions of the battery detector logic gate 58, before being applied to the inverting input of comparator 150. A capacitor 160 is effective to filter any variation in the battery voltage appearing across divider resistor 158. Thus, when a battery is connected to the terminals 142, and if the battery terminal voltage is less than full charge rating which is correspondingly less than the reference voltage applied to the noninverting input, the output of the comparator 150 will be at a logic high state. Manufacturer specifications generally define when a battery is fully charged, and if the terminal voltage falls below such value, the battery is assumed to require charging. For example, a battery providing a nominal terminal voltage of 12 volts may have a full charge voltage of 12.5 volts, and if the voltage falls below 11.5 volts, the battery requires charging. The output of the comparator 150 is coupled to the AND circuit 52. The AND circuit 52 comprises a first logic AND gate 162 having three inputs connected respectively to the output of the comparator 92, the output of the comparator 120, and the output of the comparator 150. When all three comparators are at a logic high state, the AND gate 162 output is also at a logic high state. The AND circuit 52 further includes an AND gate 58 having one input connected to the output of AND gate 162. The other input of AND gate 58 also senses the battery terminal voltage, as divided by resistor divider 56.

The values of resistor 156 and 158, in conjunction with the minimum logic high threshold characteristic of the logic gate 58, provide an indication of whether or not a battery is connected to the terminals 142. Integrated circuit logic gates have specified minimum values of logic high input voltages which will guarantee a specified output. The minimum input logic high specification is also a function of the supply voltage of the integrated circuit. Hence, with a given supply voltage, and a specified minimum logic high input, the resistors 156 and 158 of the divider 56 are selected to provide a divided voltage that corresponds to the terminal voltage of a substantially dead battery. Thus, any battery having a greater terminal voltage, will provide a logic high to the AND gate 58, thereby providing an indication that a battery is connected to the charger 10.

With the foregoing arrangement, when line 164 exceeds the minimum logic high value of the gate 58, and when the output of AND gate 162 is high, all conditions are satisfied for producing a trigger to the switching device 42. The output of AND gate 58 is coupled to the base of an NPN transistor 166 which, when driven into conduction by the logic high output of gate 58, causes the light emitting diode of the device 168 to conduct. Device 168 is an optical coupled device of the type MOC 3010. When the diode conducts, it triggers the triac that is associated with the diode within the device 168. The switching device 42 includes gate biasing resistors 170 and 172 for trigger biasing purposes. As described above, when a trigger signal is provided to the switching device 42 by way of the trigger circuit 60, the device 42 remains conductive until the current therethrough passes through zero or is otherwise extinguished.

A visual indication of the operation of each battery charging control circuit 140 and 144 is provided by way of the respective light emitting diodes 180 and 182. When the output of the comparator 150 is a logical high, as well as the battery voltage on line 164, the output of a logic gate 184 is driven to a logic high level, thereby causing the light emitting diode 180 to illuminate. The blinking rate of the light emitting diode 180 is an indication of the rate at which battery charging pulses 62 and 64 are supplied to the battery.

From the foregoing, a highly versatile, but uncomplicated battery charging circuit has been disclosed. While the principles and concepts of the invention have been set forth above, it is to be understood that the circuits and mode of operation are not limited by the disclosure hereof. Also, it is not necessary to adopt all of the various advantages and features of the invention in order to realize the individual advantages thereof. Therefore, while the embodiment of the invention has been disclosed with reference to particular battery charger circuits, it is to be understood that many changes in detail may be made as a matter of engineering choice without departing from the spirit and scope of the invention, as defined by the appended claims.

What is claimed is:

1. A battery charger, comprising:
 a source of electrical power for providing signals of cyclically varying amplitude;
 a switching device that is triggerable for coupling at least a portion of the varying amplitude signals to a battery to be charged;
 a trigger circuit for providing a trigger signal to the switching device;
 a logical ANDing circuit having at least two inputs for receiving electrical signals corresponding to criteria that must be satisfied before the switching device can be triggered, said logical ANDing circuit having an output for enabling the trigger circuit so that when the trigger criteria is satisfied, the switching device is triggered; and
 a trigger level detector coupled to one input of said logical ANDing circuit and responsive to a predetermined amplitude of the varying amplitude signal for enabling said ANDing circuit when the varying amplitude signal is below a predefined trigger level.

2. The battery charger of claim 1, further including a negative slope detector coupled to one input of said logical ANDing circuit and responsive to said varying amplitude signal for enabling said ANDing circuit when a negative slope of said varying amplitude signal occurs.

3. The battery charger of claim 1, further including a full charge detector coupled to one input of said logical ANDing circuit for enabling when the terminal voltage of said battery is less than a full charge magnitude.

4. The battery charger of claim 1, further including a battery detector circuit coupled to one input of said logical ANDing circuit for enabling when a battery is physically connected to an output of said charger, and for disabling the ANDing circuit when the output of the battery charger is short circuited.

5. The battery charger of claim 1, wherein said switching device comprises a silicon controlled rectifier (SCR) having an anode connected to the source of the varying amplitude signals, and a cathode connected to a terminal of the battery, and wherein said trigger circuit triggers the SCR at a predefined magnitude of the varying amplitude signals, whereby battery charging pulses coupled to the battery by the SCR do not vary substantially in amplitude, but vary in pulse width as a function of the terminal voltage of the battery.

6. The battery charger of claim 1, further including an input AC receptacle for coupling an AC voltage to said switching device, said AC voltage defining said varying amplitude signal, and further including a plurality of AC cords, each having an identical connector at one end, and each having a different electrical connector at the respective opposite end, whereby the battery charger can be utilized with plural different AC distribution systems.

7. The battery charger of claim 1, further including a negative slope detector circuit producing an output during negative slope time periods of the varying amplitude signal, and wherein said negative slope detector circuit enables said logical ANDing circuit during negative slope time periods of the varying amplitude signals, whereby the signals coupled through said switching device are always equal to or less than said predefined trigger level and occur coincident during negative slope time periods of the varying amplitude signals.

8. The battery charger of claim 1, further including a battery detector connectable to the battery, said battery detector being coupled to said logical ANDing circuit for enabling thereof, said battery detector including a logic gate having an input so that when a voltage supplied thereto from the battery exceeds a minimum logic one amplitude, the logical ANDing circuit is enabled.

9. The battery charger of claim 1, further including a negative slope detector responsive to the varying amplitude signal for providing an output indication when the varying amplitude signal is characterized by an negative slope, said negative slope detector comprising a ramp generator having a timing period corresponding to a period of said varying amplitude signal, said ramp generator output being coupled to one input of a comparator, and a reference voltage coupled to a different input of said comparator whereby said comparator provides an enabling output corresponding to a negative slope time period of the varying amplitude signal.

10. A battery charger, comprising:
means for rectifying an AC signal;
a switching device that is triggerable for coupling at least a portion of the rectified AC signal to a battery to be charged;
a slope detector for providing a first enable signal during at least a portion of a negative slope of the rectified AC signal;
a trigger circuit responsive to a predefined trigger level occurring on said rectified waveform for providing a second enable signal; and
a combining circuit for combining the first and second enable signals for triggering said switching device at said trigger level and on a negative slope of the AC signal, and said switching device remains conductive so long as the trigger level on the AC signal exceeds a voltage of about that of the battery terminal voltage.

11. The battery charger of claim 10, wherein said trigger circuit trigger said switching device at a predetermined magnitude, and as said battery terminal voltage increases, the charging pulses passed by said switching device are characterized by smaller pulse widths.

12. The battery charger of claim 10, further including a detector for enabling said trigger circuit, said detector defined by a comparator having a reference voltage on one input and another voltage representative of the battery terminal voltage on another input, and wherein said reference voltage corresponds to a battery terminal voltage below which the battery requires charging, whereupon said switching device is not triggered unless the battery requires charging.

13. The battery charger of claim 10, further including multiple outputs for connection to a corresponding multiplicity of batteries, a single trigger circuit for triggering a multiplicity of switching devices, each said switching device switchably coupling a portion of the AC signal to an associated output of the battery charger, and further including a plurality of full charger detection circuits, each for detecting when a respective battery is fully charged.

14. The battery charger of claim 10, wherein said slope detector is responsive to the rectified AC signal for providing said first enable signal, and said trigger circuit provides said second enable signal defining a time period when the amplitude of the AC signal is less than a predefined threshold amplitude, and said combining circuit includes an ANDing circuit for providing an output trigger signal having a pulse width about equal to a time period in which the first and second enable signals are coincident in time.

15. A method for charging a battery, comprising the steps of:
rectifying AC signals and coupling the rectified signals to a switching device;
coupling at least a portion of the rectified AC signals to the battery if the switching device is triggered on;
triggering the switching device on a negative slope portion of the AC signals and at a predefined amplitude of the negative slope for providing substantially constant amplitude pulses to a battery to be charged, said pulses having an amplitude independent of the peak voltage and independent of frequency variations of the rectified AC signals; and
comparing the terminal voltage of the battery with a reference to determine whether the battery requires charging, and allowing the switching device to be triggered so long as the battery requires charging.

16. The method of claim 15, further including detecting whether a battery having a minimum voltage is connected to a pair of output terminals, and if such a battery is connected to the output terminals, enabling triggering of the switching device, and if the pair of output terminals are short circuited together, preventing triggering of the switching device.

17. The method of claim 16, further including detecting said connection of the battery by associating a minimum battery terminal voltage with a logic level of a logic gate, and providing a predetermined output of the logic gate when a battery with at least said minimum battery terminal voltage is connected to the output terminals.

18. The method of claim 15, further including sensing the presence of;
1) a predetermined amplitude of said rectified AC signal;
2) a negative slope of the rectified AC signal;
3) the presence of a battery connected for charging;
4) an indication that the battery requires charging; and triggering the switching device on the presence of steps 1)–4).

19. A battery charger, comprising:
a rectifier for converting AC signals into rectified signals;
a switching device that is triggerable to couple at least portions of the rectified signals to a battery to be charged;
a logical ANDing circuit having plural inputs, and an output for enabling the switching device to be triggered;
a trigger level detector for sensing the rectified signal and providing an output when the instantaneous voltage of the rectified signal is below a specified level, said trigger level detector output being coupled to an input of said logical ANDing circuit;
a negative slope detector producing an output during a time period of a negative slope portion of the rectified signal, said negative slope detector output being coupled to an input of said logical ANDing circuit;

a full charge detector circuit responsive to the battery terminal voltage for providing an output to an input of said logical ANDing circuit when said battery terminal voltage is below a specified voltage; and a battery detector circuit responsive to the connection of a battery to the battery charger, for providing an output to an input of said logical ANDing circuit; and whereby said logical ANDing circuit is responsive to the inputs thereof for enabling said switching device to be triggered.

20. The battery charger of claim 19, further including plural switching devices each associated with a different output of said battery charger, and each associated with a different full charge detector and battery detector, and each associated with a common trigger level detector and negative slope detector.

21. The battery charger of claim 19, wherein said ANDing circuit comprises two AND gates, each having plural inputs, and one AND gate having an output connected to an input of the other AND gate.

22. The battery charger of claim 19, wherein said battery detector circuit is responsive to a minimum battery terminal voltage to enable said ANDing circuit, and disables said ANDing circuit when the battery terminal voltage is below said minimum.

23. The battery charger of claim 22, further including a pair of output terminals to which a battery is connectable, and wherein said battery detector circuit disables said ANDing circuit when the pair of output terminals are short circuited together.

* * * * *

UNITED STATES PATENT AND TRADEMARK OFFICE
CERTIFICATE OF CORRECTION

PATENT NO. : 5,214,369

DATED : May 25, 1993

INVENTOR(S) : McCrea

It is certified that error appears in the above-identified patent and that said Letters Patent is hereby corrected as shown below:

Column 8, line 23, delete the word --o-- and insert the word --on--.

Column 11, line 66, delete the word --charger-- and insert the word --charge--.

Signed and Sealed this

Twenty-fifth Day of January, 1994

Attest:

BRUCE LEHMAN

*Attesting Officer*      *Commissioner of Patents and Trademarks*